United States Patent
Wunning

[11] Patent Number: 5,154,599
[45] Date of Patent: Oct. 13, 1992

[54] METHOD FOR APPARATUS FOR COMBUSTING FUEL IN A COMBUSTION CHAMBER

[76] Inventor: Joachim Wunning, Berghalde 20, 7250 Leonberg 7, Fed. Rep. of Germany

[21] Appl. No.: 722,258

[22] Filed: Jun. 27, 1991

[30] Foreign Application Priority Data

Jun. 29, 1990 [EP] European Pat. Off. ......... 90112392.7

[51] Int. Cl.⁵ ............................................. F23D 11/44
[52] U.S. Cl. .................................. 431/215; 110/204; 110/205; 110/302; 110/303; 431/9; 431/10; 431/116
[58] Field of Search ................ 431/9, 10, 116, 215; 110/204, 205, 235, 347, 302, 303

[56] References Cited

U.S. PATENT DOCUMENTS

| 5,044,932 | 9/1991 | Martin et al. ..................... 431/116 |
| 5,044,935 | 9/1991 | Peter .................................. 431/9 X |
| 5,062,789 | 11/1991 | Gitman ............................... 431/9 |

FOREIGN PATENT DOCUMENTS

| 0194000 | 9/1986 | European Pat. Off. . |
| 2303280 | 7/1974 | Fed. Rep. of Germany . |
| 3422229 | 12/1985 | Fed. Rep. of Germany . |

Primary Examiner—Edward G. Favors
Attorney, Agent, or Firm—Frishauf, Holtz, Goodman & Woodward

[57] ABSTRACT

To avoid high NOx emissions, the fuel is oxidized with an extremely high exhaust gas recirculation ration substantially without flames and without pulsations.

31 Claims, 6 Drawing Sheets

S > 6·d
A > 2·d

METHOD FOR APPARATUS FOR COMBUSTING FUEL IN A COMBUSTION CHAMBER

REFERENCE TO RELATED PUBLICATIONS

US Pat. Nos. 4,877,396 and 4,878,839. German Pat. Nos. 23 03 280 and 34 22 229.

Gaswarme International, Vol. 34, issue 4 (April, 1985), pp. 162–166.

FIELD OF THE INVENTION

The invention relates to a method for combustion of fuel in a combustion chamber, in which fuel is oxidized with preferably preheated combustion air in the presence of recirculated exhaust gases.

The invention also relates to an apparatus for performing this method, having a nozzle arrangement for combustion air, which re-aspirates combustion gases by injector action, having air guide means for delivering combustion air to the nozzle arrangement, having a fuel delivery arrangement, and optionally having an arrangement for preheating the combustion air.

BACKGROUND

The classical method for converting fuel energy into heat is the oxidation of the fuel into flames with an oxidizing agent. When natural substances (coal or hydrocarbons with air) are combusted, the flame temperature is in the range from approximately 1600° to 2000° C., with the advantage that after the ignition event the oxidation of the fuel proceeds on its own in the flame front, even under unfavorable conditions (such as an open fire in a fireplace, or the like). This principle is also adhered to when gaseous or liquid fuels are combusted with burners; provisions for stabilizing the flame play a major role. Burners with a capacity ranging from a few kW to several MW are classified, depending on the delivery of fuel and air, as premix burners and orifice mix burners. In the case of the latter type, the combustion air can be preheated up to very high temperatures in order to recover the exhaust gas heat. The ratio between the preheated temperature of the combustion air and the temperature of the exhaust gas upon leaving the combustion chamber (both expressed in ° C.) is known in somewhat simplified terms as the relative air preheating $\epsilon$. In the industry, air preheating values $\epsilon$ of approximately 0.7 are achieved in so-called recuperator burners, and up to approximately 0.9 with so-called regenerator burners.

Preheating of the combustion air does allow considerable economy in energy; however, it increases the flame temperature and thus leads to a very major increase in thermal NOx formation. The symbol NOx designates nitrogen oxides in general. These nitrogen oxides are undesirable because of the environmental pollution they cause. Legal regulations accordingly exist that limit the allowed NOx emissions, and the trend is to increasingly lower the allowable limits.

Known low-NOx burners operate with so-called graduated combustion (German Pat. No. 34 22 229) and/or cooling of the flame with recirculated exhaust gas (see, for instance, Gaswarme International [Gas Heat International], Vol. 38 (1939), issue 5, June/July, pp. 283–292; page 290).

To cool the flame and lower NOx emissions, exhaust gas from the combustion chamber is either re-aspirated hydraulically (internal recirculation) or resupplied from outside (external recirculation). For the sake of flame stability, the admixture of exhaust gas is limited to a maximum of approximately 50% referred to the quantity of combustion air.

For flame stabilization it is additionally known to return hot gas directly from the flame to the flame root, and with burners that use free-flowing fuels, to return this hot exhaust gas first to the fuel stream, in order to evaporate the fuel, as a rule oil, prior to combustion and admixture of the combustion air (these are known as "blue burners"). One example of this is described in German Pat. No. 23 03 280.

In addition to combusting fuel in flames, so-called flameless combustion of the fuel is also known, which has already been industrially employed in radiant burners (Gaswarme International, Vol. 34, (1985), issue 4, April, pp. 162–166). The oxidation of the gaseous fuel occurs directly at the surface of a porous, usually ceramic body, which gives off the heat by radiation. The relatively low temperature of the oxidation leads to low NOx formation. Since the fuel is premixed with the combustion air, however, the combustion air can be preheated only a little, because otherwise premature ignition or thermal decomposition of the fuel will occur. This makes these burners uneconomical for relatively high capacities and high temperatures (above approximately 900° C.); moreover, the shape of the radiant body places limits on their use.

THE INVENTION

It is an object of the invention to create a method and an apparatus that make it possible to carry out the oxidation of fuels with air, making extensive use of the heat liberated in the oxidation, and in so doing reducing the formation of nitrogen oxides (NOx).

Briefly, the procedure in the method according to the invention is that exhaust gases from combustion, from which useful heat dissipated to the outside from the system has previously been withdrawn, are mixed with the preheated combustion air at a combustion exhaust gas recirculation ratio of $r \geq 2$ (the exhaust gas recirculation ratio is defined as the ratio between the flow rates of the recirculated exhaust gas and of the combustion air supplied), and this mixture of exhaust gas and combustion air is kept at a temperature that is higher than the ignition temperature, and the mixture of exhaust gas and combustion air is then brought together with the fuel, forming an oxidation zone in which a substantially flameless, pulse-free oxidation occurs in the combustion chamber.

Because of the premixing of exhaust gas and air at a ratio of $r \geq 2$, the oxygen content of the mixture is lowered to below 8%, if the usual excess air of 10%, corresponding to an oxygen content of 2% in the exhaust gas, is used. If there is a still higher amount of excess air, this must be compensated for by admixing a larger quantity of exhaust gas.

This method operates with an extremely high rate of exhaust gas recirculation ($r \geq 2$), so that even with complete air preheating ($\epsilon = 1$), the maximum temperatures (1500° C.) that occur upon oxidation are lower than in the case of combustion of the fuel in flames. Despite high air preheating and thus optimal exploitation of the exhaust gas heat, the NOx values occurring in flameless oxidation are lowered to far below the values that would occur if the fuel were combusted with flames without preheating of the combustion air. Thus the novel method has virtually overcome the previously existing conflict between the goals of energy economy from air preheating and the most extensive possible avoidance of the formation of nitrogen oxides. Moreover, as experience has confirmed, the noise level in the combustion chamber is drastically reduced in the novel method compared with the noise produced in combustion with flames, because the pressure fluctuations in the flame front that are definitive for noise production are omitted.

The return of the combustion gases, partly cooled down as a result of the removal of useful heat, from the combustion chamber and their mixture with the preheated combustion air can intrinsically be done in various ways, and even external recirculation is conceivable in principle. However, particularly suitable conditions are obtained if the combustion air is guided in the form of air streams emerging from nozzles through a substantially fuel-free region, in which the air streams can become enveloped in and mix with exhaust gases aspirated from the combustion chamber by injector action. It is advantageous if the air streams are disposed in a ring and the fuel delivery is effected in the region encompassed by the air streams, at a predetermined distance downstream of the nozzle opening. With this kind of arrangement of the air streams and of the fuel delivery, the fuel is enclosed by the air streams, which is favorable for the sake of complete combustion. The distance downstream of the nozzle openings where the fuel is delivered depends on conditions in an individual case; its optimal value can optionally be ascertained by trial and error. Its maximum value is limited by the fact that in any case adequately thorough mixing of the fuel with the streams of exhaust gas and combustion air must still occur.

For the sake of high energy economy, the combustion air is suitably preheated with a degree of air preheating $\epsilon \geq 0.6$; in practice, exploitation of the heat contained in the exhaust gases is limited only by the fact that the exhaust gases vented to the atmosphere must maintain a certain minimum temperature, on account of the water vapor condensation and the like that would otherwise occur, for example.

To preheat the combustion air, exhaust gases from combustion, from which useful heat has already been removed, are as a rule used. Naturally, it would also be possible in principle to use waste heat from other processes for preheating the air. To establish the exhaust gas recirculation ratio required by the method, the minimum spacing of nozzle openings, given in aforementioned ring-like arrangement of air streams, is advantageously made to be greater than or equal to twice the nozzle opening diameter. It has also proved to be suitable for the flow speed of the combustion air at the outlet from the nozzle openings to be at least 20 m/sec. This minimum value still leaves enough play for a wide adjustment ratio, for example of 10:1. In the flameless oxidation of the novel method, there are in fact no stability criteria, for example flame stability, of the kind that arise in flame combustion.

In certain cases where a high amount of useful heat is removed, it may be necessary for the mixture of exhaust gas and combustion air to be kept at ignition temperature, at least in the oxidation zone, by supplying external heat. On the other hand, or in addition, the possibility also exists of reducing the ignition temperature catalytically in the oxidation zone, in other words by using catalysts.

To set the flameless oxidation of the fuel in motion, an adequate quantity of exhaust gas for admixing with the combustion air must be available, on the one hand, and on the other hand the mixture of combustion air and exhaust gas must be at least at ignition temperature.

In cold starting, these conditions can naturally be artificially created in principle by suitable air preheating with external heat. Particularly simple conditions arise, however, if in this kind of starting, fuel in the combustion chamber is first combusted with a suitable air excess with a stable flame, before the mixture of combustion air and exhaust gas can be brought at least to the ignition temperature, so that then by suitably varying the delivery of combustion air and/or fuel, the reaction conditions in the oxidation zone make a transition to substantially flameless and pulse-free oxidation.

In studying flameless oxidation in the oxidation zone, it was found that once the flame vanishes, not only the blue light and the noises of flame but also the emission of radiation in the UV range (approximately 190 to 270 nm) that otherwise occur in oxidation vanish. This affords an important aid of optimizing as well as monitoring the oxidation process, in that the flame in the UV range upon startup and the vanishing of this emission of light in the UV range after the onset of substantially flameless and pulse-free oxidation can be monitored. The findings from the measurement values obtained are precisely opposite to those for combustion with flames. In that kind of combustion, the appearance of a UV signal indicates that the flame is burning stably, while the UV signal disappears when the flame goes out. To monitor the substantially flameless, pulse-free oxidation, the temperature increase in the combustion chamber, measured downstream of the oxidation zone, is therefore advantageously used.

An apparatus intended to carry out the already explained method has the important feature that by corresponding arrangements an implementation of the nozzle device operates with a sucking back of combustion product gases in a feedback ratio of $r \geq = 2$. The air for supporting combustion issuing out of the nozzle arrangement can mix with the partly cold combustion product gases with the formation of a mixture of air and exhaust gas having at least the ignition temperature and the fuel supply device for introducing the fuel to this mixture is directed in such a way that the oxidation zone forms in the combustion chamber and provides a substantially flameless and pulsation free oxidation of the fuel.

DRAWINGS

DETAILED DESCRIPTION

Figure 2:
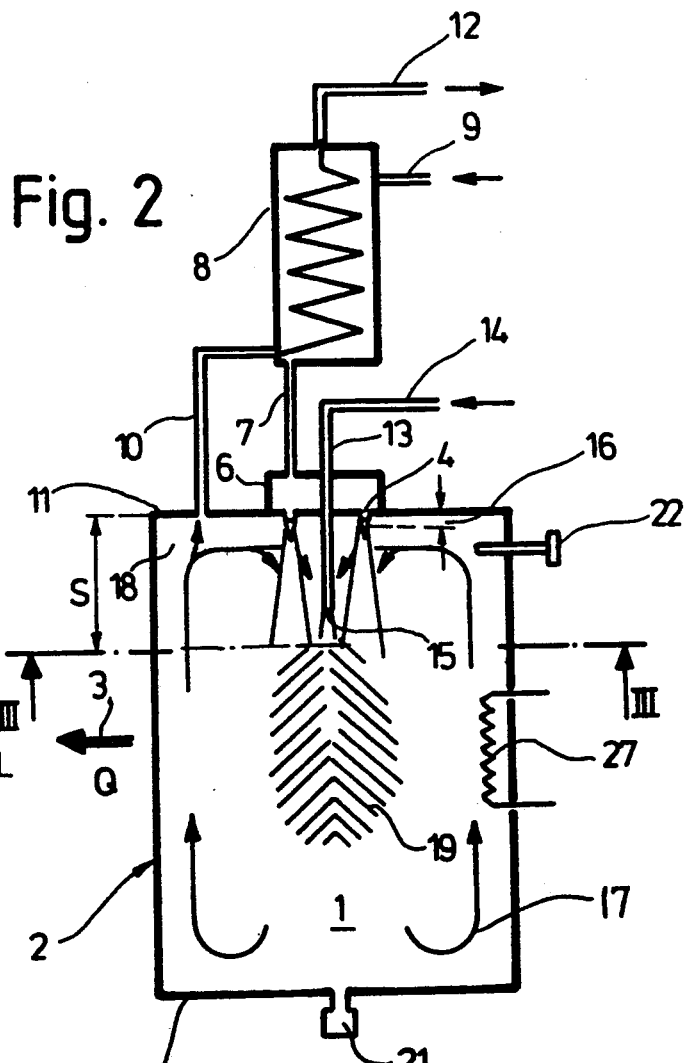
FIG. 2 is a schematic sectional side view of an apparatus for performing the method of the invention.
Figure 3:
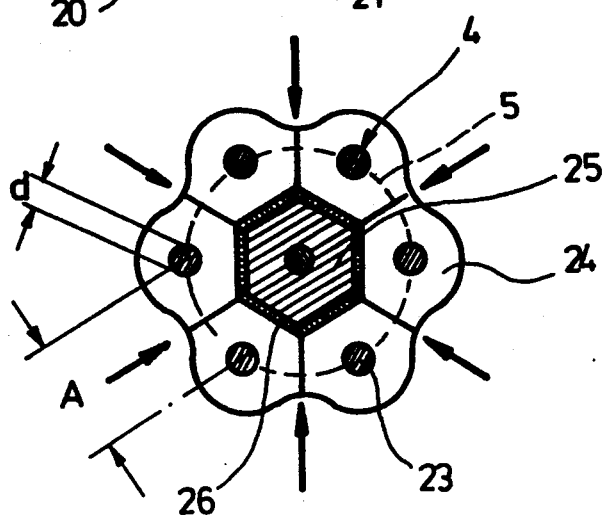
FIG. 3 is a schematic plan view of the apparatus of FIG. 2, in a section taken along the line III—III of FIG. 2.

The novel method serves to oxidize fuel under controlled conditions at low temperatures (less than or equal to 1500° C.) with highly preheated air so as to produce low NOx emissions. Its basic course will be described first in conjunction with FIGS. 1 to 3:

FIGS. 2, 3 schematically show an apparatus for substantially flameless, pulse-free oxidation of a gaseous fuel (such as natural gas). This apparatus has a closed-off combustion chamber 1, which is located in a chamber 2 from the outer wall of which useful heat Q can be dissipated, as indicated by an arrow 3. In the region of an end wall of the substantially cylindrical chamber 2, six nozzles 4 are provided, which form a crown with the parallel axes of the nozzles intersecting a common circle 5 (FIG. 3) and communicate with an air distributor housing 6 that adjoins the associated chamber wall. Connected to the air distributor housing 6 via an air line 7 is an air preheater 8, for instance embodied as a heat exchanger, to which combustion air can be supplied via an air inlet neck 9.

An exhaust gas line 10, laterally offset from and adjacent to the crownlike array of combustion air nozzles 4, leads from the combustion chamber 1 in the end wall 11 that carries the nozzles 4. The exhaust gas line 10 leads to an air preheater 8, from which an exhaust gas neck 12 extends by way of which the cooled exhaust gases are vented to the atmosphere. In the air preheater 8, the hot combustion gases flowing in via the line 10 are carried in countercurrent to the combustion air delivered at 9; in this process they give up their heat to the combustion air and preheat it.

A fuel delivery line 13 discharges into the combustion chamber 1 in the region encompassed by the ring of nozzles 4 and is connected to a fuel delivery neck 14, with the mouth 15 of this line spaced apart by a predetermined distance from the mouths of the nozzles 4, which in turn are axially offset by an amount indicated at 16 from the inside of the chamber wall 11.

As can be seen from FIG. 2, the mouth 15 of the fuel delivery line 13 is spaced apart by a predetermined axial distance downstream from the mouths of the nozzles 4.

The axis spacing A of the openings of adjacent nozzles 4 is greater than twice the diameter d of one nozzle opening; in practice, this spacing is between 3 and 10 d or more.

In steady operation, combustion air is introduced to the combustion chamber 1 via the nozzles 4 and emerges from the openings of the nozzles 4 in the form of streams of air, which are directed substantially axially parallel or slightly obliquely inward with respect to the axis of the central fuel delivery line 13. A circulatory flow of hot exhaust gases exists in the combustion chamber; this flow is represented by arrows 17 and is deflected laterally in the region of the chamber wall 11. The air streams emerging from the nozzles 4 therefore first pass through a chamber that is substantially free of fuel and is filled with the returning exhaust gases, because the air streams, by injector action, aspirate exhaust gases and in this process become enveloped by or mix with these exhaust gases. The result is accordingly streams of a mixture of combustion air and exhaust gas within a mixing path or mixing zone 18; these streams contain an oxygen gradient oriented from the outside in, such that the outer zones of the streams of mixture are depleted of oxygen.

By the aforementioned selection of the ratio between the nozzle axis spacing A and the nozzle opening diameter d, it is attained that the preheated combustion air is mixed in the mixing zone 8 with the exhaust gas, re-aspirated from the combustion chamber 1, at an exhaust gas recirculation ratio that is $r \geq 2$.

At the end of the mixing zone, fuel from the fuel line 13 is introduced into the mixture of exhaust gas and combustion air; the depth of the mixing zone 18 is at least six times the nozzle opening diameter d. The mouth 15 of the fuel delivery line 13 is located inside the mixing zone 18 here.

The exhaust gases, re-aspirated as described and mixed with the preheated combustion air, have given up useful heat Q on their return path along the side wall of the chamber 2; they have therefore already cooled down somewhat.

The deliveries of combustion air and fuel are adjusted such that under the given conditions a substantially flameless, pulsefree oxidation between the fuel and the combustion air occurs, taking place in an oxidation zone indicated at 19 in the combustion chamber 1.

This substantially flameless and pulse-free oxidation is distinguished by the fact that it proceeds with very low noise and without producing light, in particular light in the ultraviolet range. A UV detector 21 inserted into the chamber wall 20 opposite the chamber wall 11 can therefore be used to monitor the substantially flameless course of oxidation. As soon as the signal output by it vanishes, or in other words no UV radiation occurs, flameless oxidation is taking place. To monitor the oxidation itself, a temperature sensor 22 is used, which extends into the combustion chamber 1 in the vicinity of the chamber wall 11.

The conditions in the mixing zone 18 as described above are schematically shown in FIG. 3: the core streams of combustion air emerging from the openings of the nozzles 4 arranged in a ring are shown with oblique shading and identified by reference numeral 23.

They are surrounded by a jacket of aspirated exhaust gases, resulting in streams 24 of exhaust gas and air that surround a core zone into which fuel is introduced, as indicated at 25, at the end of the mixing zone 18. The oxidation of this fuel begins at the schematically represented boundary zone 26 between the fuel-filled region and the oxygen-depleted outer region of the streams 24 of exhaust gas and air.

Also disposed in the combustion chamber 1 is an auxiliary heater 27, through which the recirculating exhaust gas flows and which makes it possible to heat this exhaust gas sufficiently, for instance during startup, so that the mixture of exhaust gas and combustion air in the mixing zone 18 is brought at least to the temperature of ignition.

Since the combustion air emerges from the nozzles 4 at relatively high speed (approximately 20 m/sec), a high momentum flow results in the combustion chamber 1, which assures rapid temperature compensation in the combustion chamber 1. At the same time, a high energy density for the removal of useful heat can be attained.

Figure 1:
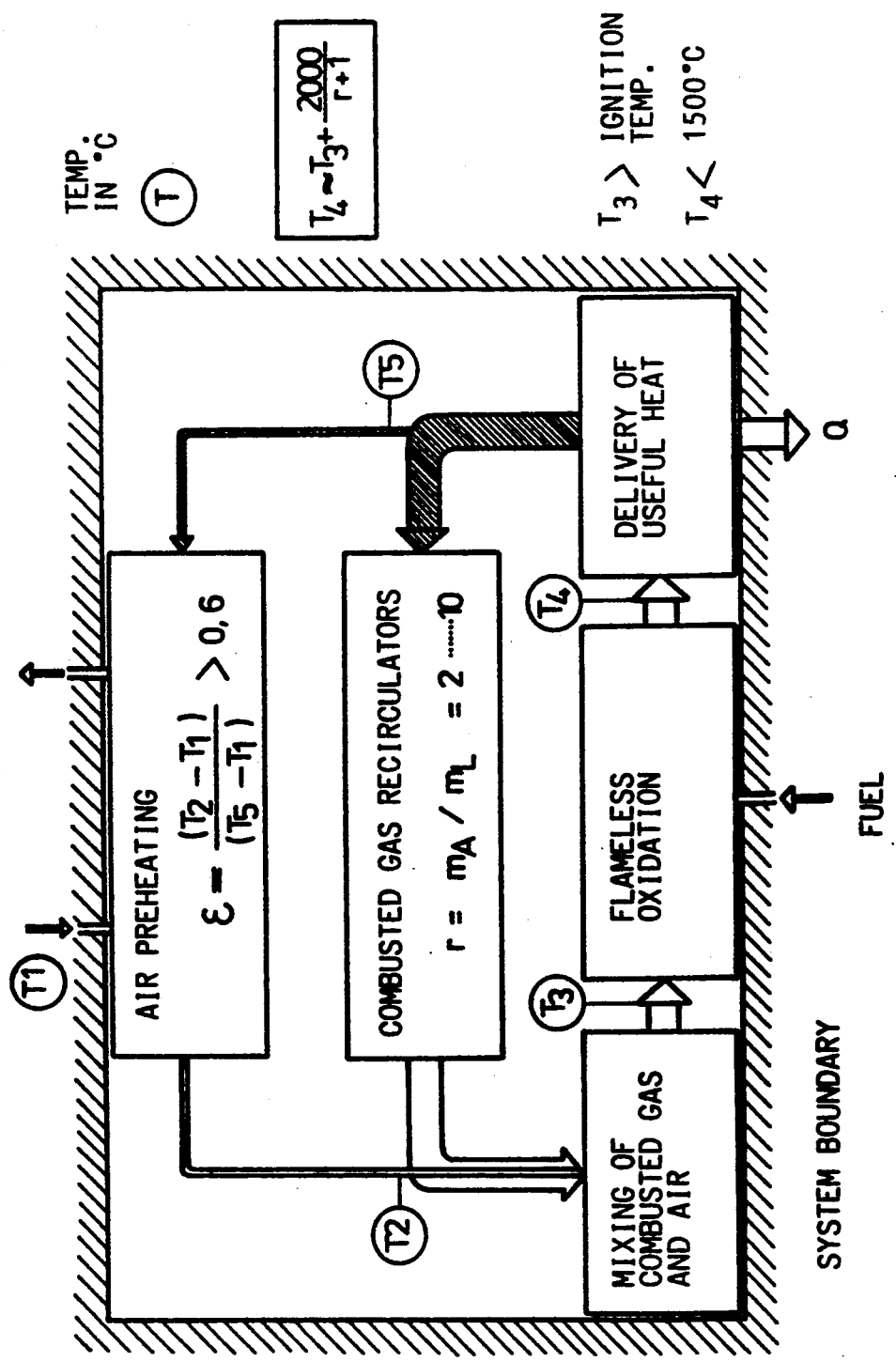
FIG. 1 is a diagram illustrating the course of the method according to the invention.

The method steps are schematically shown in Fig. 1, which also indicates the temperatures prevailing in the various method steps.

The useful heat Q removed from the chamber wall 2 is decoupled from the entire system; it is therefore not available for air preheating.

Figure 4:
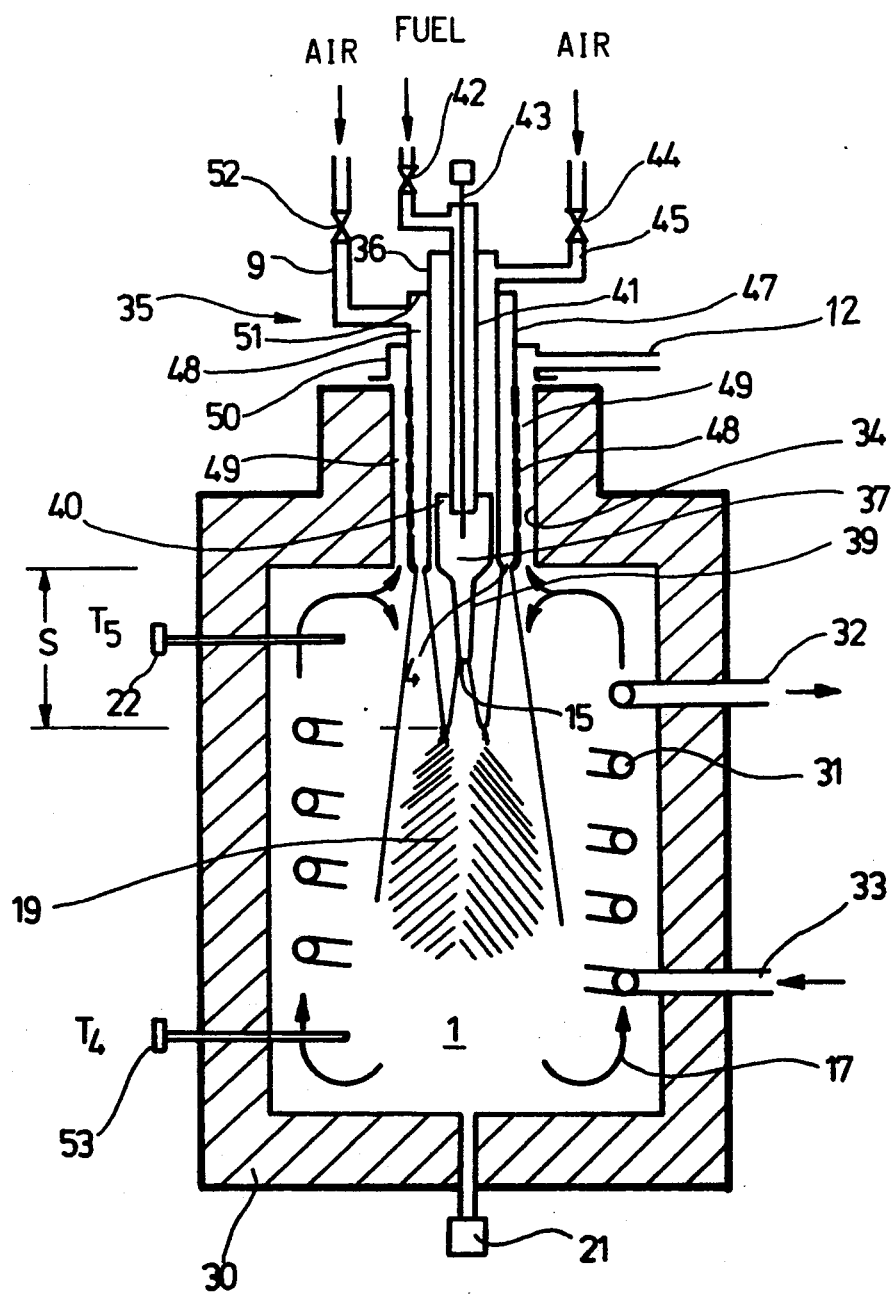
FIG. 4 is a schematic side view in longitudinal section of a recuperator burner according to the invention.
Figure 5:
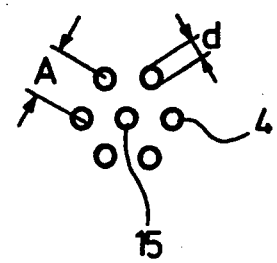
FIG. 5 is a plan view showing the disposition of the combustion air nozzles of the recuperator burner of FIG. 4.

FIGS. 4, 5 show an industrial burner in the form of a so called recuperator burner, which operates by the novel flameless oxidation method described and in principle is similar in design to the apparatus described in conjunction with the basic illustrations in FIGS. 2, 3. Identical parts are therefore identified by the same reference numerals and will not be described further.

In this case, the combustion chamber, which for example is likewise cylindrical in cross section, is contained in a walled-in furnace chamber 30, disposed in which is a tube coil 31, through which a heat transfer agent such as heat transfer oil flows and around which the returning hot exhaust gas flows, from which it draws useful heat before this exhaust gas reaches the region of the combustion air nozzles 4. The heating coil 31 surrounds the flameless oxidation zone 19; thermal decoupling is effected via a connection neck 32, while the cold heat transfer agent flows in via a connection neck 33.

The combustion chamber 30 has a coaxial cylindrical opening 34 on its end, into which the recuperator burner identified overall by reference numeral 35, is detachably inserted. This burner is formed with a cylindrical air guide cylinder 36 closed on one end, into the other end of which a cylindrical, cup-shaped ceramic combustion chamber 37 is inserted. The combustion chamber 37 is formed with a coaxial outlet nozzle 39 protruding into the combustion chamber 1 in the manner of a neck, and the mouth of this nozzle is again identified by reference numeral 15. On the opposite end, the combustion chamber 37 is provided with air inlet openings 40, which are disposed laterally beside a coaxial fuel delivery line 41 that protrudes into the combustion chamber 37 and is controlled by a valve 42, and by way of which gaseous fuel, such as natural gas, can be delivered. An ignition lance 43 located in the interior of the fuel delivery line 41 enables ignition of the gas-air mixture formed in the interior of the combustion chamber 37 electrically with high voltage, as known per se.

The air guide cylinder 36 may be acted upon by auxiliary combustion air for starting, via a line 45 containing a valve 44, as will be described in detail hereinafter.

Disposed coaxially with and surrounding the air guide cylinder 37 is a cylindrical wall 47, which is part of a recuperator and which has heat exchanger baffles 48 that protrude at one end into the annular chamber 48 defined by the air guide cylinder 36 and on the other into the annular chamber 49 formed between the inner wall of the opening 34 and the cylindrical wall 47 and opening into the combustion chamber 1. This latter annular chamber is closed with a lid 50, from which the exhaust gas neck 12 extends.

The annular chamber 48 is also closed at one end at 51, and at its opposite end it discharges into the nozzle openings 4, arranged in a ring in a corresponding annular baffle and disposed axially parallel with one another. The combustion air delivery neck 9 is connected to the annular chamber 48 via a valve 52.

The ring-like arrangement of the openings of the nozzles 4 can be seen from FIG. 5. In the present case, six nozzles 4 are provided, but the number may also be higher. The axis spacing A between adjacent openings of the nozzles 4 is again greater than twice the nozzle opening diameter d. The axial depth s of the mixing zone 18 is greater than six times the nozzle opening diameter d. In addition to the temperature sensor 22, a further temperature sensor 53 is also present, protruding into the combustion chamber 1 in the vicinity of the lower inner wall of the furnace chamber 30 and thus measuring the temperature T5 (Fig. 1) of the hot exhaust gases prior to the removal of the useful heat.

The recuperator burner 35 described here operates with an exhaust gas recirculation ratio $r \geq 2$; its mode of operation is as follows:

During start-up from a cold state, the valve 52 is closed or severely throttled down, so that the nozzles 4 are acted upon by combustion air only to a highly reduced extent, if at all. The valve 44 is closed, and consequently combustion air enters the combustion chamber 37 through the air inlets 40.

The valve 42 is likewise opened; the fuel-air mixture forming in the combustion chamber 37 is ignited by means of the ignition lance 43. The partially-combusted gas mixture emerges from the nozzle 39 and is combusted completely, with combustion air delivered from the nozzles 4, thus producing flames. The burner operates in the conventional manner up to this point.

The exhaust gases produced in this flame combustion take the flow path indicated at 17 and flow out through the annular conduit 49 and the exhaust gas neck 12. In this process the recuperator formed by the cylindrical wall 47 and the heat exchanger baffles 48 is heated on the exhaust gas side.

As soon as the outflowing exhaust gases have attained a sufficiently high temperature, the valve 44 is at least partly closed, while at the same time the valve 52 is opened fully, so that the air throughout through the air openings 40 of the combustion chamber 37 is blocked off or throttled to at most 30% of the total air quantity, and the nozzles 4 experience the full action of the combustion air.

The streams of air, preheated in the recuperator 47, 48, that emerge from the openings of the nozzles 4 arranged in a ring are enveloped by and mix in the mixing zone 18 with the recirculated exhaust gases aspirated by injector action as already described in conjunction with FIGS. 2, 3, and form a mixture of exhaust gas and combustion air the temperature T3 of which is above the ignition temperature. The fuel is introduced into this mixture via the nozzle opening 15 of the combustion chamber 37 at the outlet of the mixing zone 18, which accordingly is acted upon now only by fuel.

Thus the combustion involving flames that previously occurred changes into the flameless, pulse-free oxidation of the fuel in the oxidation zone 19, whereupon the normal operating state of the recuperator burner 35 is attained.

The fuel delivery is adjusted accordingly by suitable control of the valve 42. Oxidation monitoring is effected by means of the temperature sensors 22, 53 and the UV flame detector 21, which with the onset of flameless oxidation no longer produces a continuous signal.

An exemplary embodiment for carrying out the substantially flameless, pulse-free, controlled oxidation of fuel in a recuperator burner embodied in accordance with the principles of FIGS. 4, 5 is described below:

Controlled, Flameless Oxidation of Fuel in Streams of Exhaust Gas and Air

Recuperator burner installed on the end of a furnace or combustion chamber as in FIG. 4.

Combustion chamber (30) insulated with a super-refractory fiber mat.

Diameter, inside: 600 mm; length, inside: 2300 mm; wall loss at 1000° C.: approximately 20 kW (equivalent to useful heat).

Recuperator burner embodied with cylindrical rib recuperator (47, 48) and ceramic combustion chamber (37) for flame operation.

| Air nozzles (4) | |
|---|---|
| number | n: 12 |
| diameter | d: 7 mm |
| ring diameter | D: 80 mm |
| axial spacing | A: 21 mm |
| Combustion air: | 25 m³/h |
| Natural gas: | 2.5 m³/h |
| Oxygen in exhaust gas: | approximately 2 vol % |

Flame operation up to 750° C. with approximately 70% internal air through the nozzle (39) and 30% nozzle air through the nozzles (4) as secondary air (graduated stream burner). The burner was ignited automatically with high voltage and monitored by a UV flame detector (21). The flame shines with a blue light.

NO in the dry exhaust gas at 700° C.: 80 ppm.

For operation with flameless oxidation, all the inside air is shifted over to the ring of nozzles at 750° C. The blue flame goes out. The UV signal first continues to flicker and then vanishes entirely.

At a combustion chamber temperature of 1100° C., the air preheating was approximately 810° C., corresponding to an $\epsilon$ of 0.75. An NOx content of <10 ppm was measured in the dry exhaust gas.

Upon switchover to flame operation with 70° inside air at 110° C., contrarily, 300 ppm of NOx were detected.

It has been demonstrated that with an axially parallel fuel delivery, as illustrated in FIG. 4, the nozzle 39, after startup, can be further retracted out of the combustion chamber 1 without producing a flame in the oxidation zone 19. Embodiments in which the fuel nozzle or in general the mouth of the fuel delivery device is embodied as longitudinally adjustable are therefore also conceivable.

Figure 6:
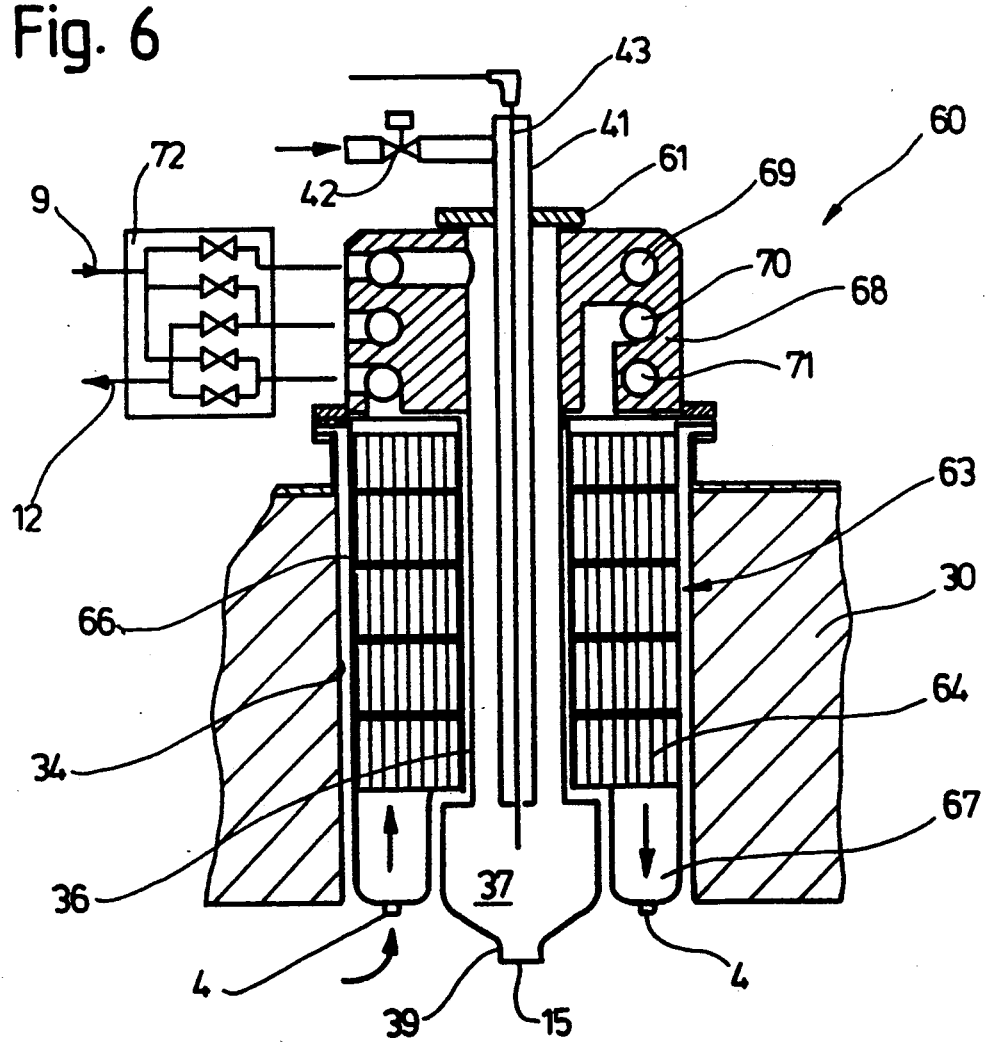
FIG. 6 is a schematic side view in axial longitudinal section of a regenerator burner according to the invention.
Figure 7:
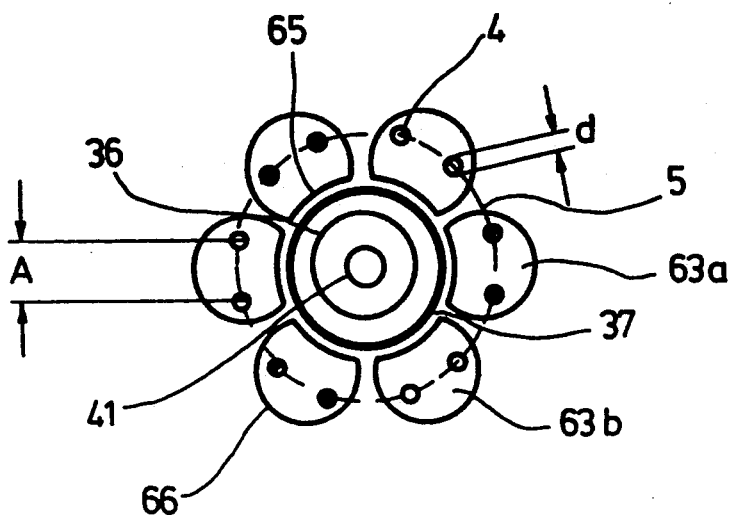
FIG. 7 is a schematic end view, seen from the nozzle end, of the recuperator burner of FIG. 6.

FIGS. 6, 7 show an industrial burner in the form of a so called regenerator burner that operates by the novel method. Parts identical to those of the apparatus of FIGS. 2, 3 or of the recuperator burner of FIGS. 4, 5 are identified by the same reference numerals and will not be explained again.

The regenerator burner, designated overall by reference numeral 60, is again inserted into the opening 34 of a furnace 30, in which the furnace chamber, not further shown, is embodied. It has a coaxial air guide cylinder 36, in which the coaxial fuel delivery line 41 and the coaxial ignition lance 43 extending in it are disposed. The air guide cylinder 36 is closed on the end with a lid 61 and on the other end discharges into the cup-shaped super-refractory combustion chamber 37, made of ceramic, the coaxial nozzle of which having the nozzle opening 15 is again identified by reference numeral 39. Six regenerator cartridges 63 disposed surrounding the air guide cylinder 36 are associated with it and are located in the opening 34 of the furnace wall. Each of the regenerator cartridges 63 comprises a number of ceramic storage bricks 64, stacked one above the other in the direction of flow and containing continuous flow conduits. Storage bricks of this kind are known; reference may be made for instance to EDI-Warmeatlas [Heat Atlas published by Society of German Engineers], 4th edition, 1984, section N, "Warmeubertragung in Regeneratoren" [Heat Transfer in Regenerators]. Each of the regenerator cartridges 63, embodied as part of a circle in cross section with a segment 65 adapted to the circumference of the air guide cylinder 36, is provided with a tubular outer jacket 66 of sheet steel receiving the storage bricks 64; adjoining this jacket on the end toward the combustion chamber is a nozzle chamber 67, in the bottom wall of which the nozzles 4 are disposed.

As can be seen from FIG. 7, each of the regenerator cartridges 63 has two nozzles 4, and all the nozzles 4 are again located with their axes on the circle 5 (FIG. 3), and adjacent nozzles 4 have the same axial spacing A. The axis spacing A of adjacent nozzles is more than twice as great as the nozzle opening diameter d. A total of 12 nozzles 4 arranged in a ring are present for six evenly distributed regenerator cartridges 63.

On the end opposite the nozzles 4, the interior of the outer jacket 66 of the regenerator cartridges 63 is connected in a sealed manner to an air distributor block 68, which is mounted coaxially on the air guide cylinder 36 and forms the head piece of the regenerator burner 60. Distributor conduits 69, 70, 71 are formed in the distributor block 68 and are connected to a valve block 72, into which the combustion air delivery neck 9 discharges and from which the exhaust gas neck 12 extends.

The disposition is selected so that the air guide conduit 69 communicates with the interior of the air guide cylinder 36 and thus with the combustion chamber 37.

The distributor conduit 70 and the distributor conduit 71 each communicate in alternation with every other regenerator cartridge 63a and 63b, respectively (FIG. 7), in such a way that the regenerator cartridges 63 are divided into two groups of three regenerator cartridges each. The valve block 72 makes it possible for the three regenerator cartridges 63a or 63b connected parallel in the direction of flow in each of these two groups to have cold combustion air and hot exhaust gases from the combustion chamber flow through it in alternation.

In principle, the mode of operation of this regenerator burner 60 is similar to that of the recuperator burner of FIG. 4, 5:

During cold start-up, combustion air is first pumped into the combustion chamber 37 via the distributor conduit 69, by suitable triggering of the valve block 72. The fuel supplied to the combustion chamber 37 is ignited there; it burns with flames in a known manner. The burner located on the inside and having the burner chamber 37 thus functions as an entirely normal, conventional gas burner. The exhaust gases produced flow through the nozzles 4 of one of the two groups of regenerator cartridges 63a, 63b and through the associated distributor conduit 70 or 71 into the exhaust gas neck 12. The nozzles 4 of the regenerator cartridges 63b, 63a of the other group have not yet, or only to a severely throttled extent, been acted upon by combustion air.

As soon as the temperature elevation required for stable, flameless operation is attained, the valves of the valve block 72 are switched over in such a way that the air supply to the combustion chamber 37 is blocked out or throttled, while at the same time the nozzles 4 arranged in a ring of the various air carrying regenerator cartridges of group 63a or 63b are supplied with the rated quantity of combustion air. The fuel valve 42 is adjusted accordingly, so that in the oxidation zone forming in the combustion chamber, essentially flameless, pulse-free oxidation of the fuel is again established.

The three regenerator cartridges 63a and 63b of the two groups have hot exhaust gases and cold combustion air flowing axially through them in alternation, as indicated in FIG. 7 by the shading of the nozzle openings 4 of one group (that carrying air).

The regenerator burner described makes it possible to operate with very major air preheating; and a degree of air preheating of $\epsilon \geq 0.9$ can be attained. Operation in which the fuel is combusted in flames can also be done with the embodiment described. A two-stage combustion can then be used, as described for instance in German Pat. No. 34 22 229.

The novel method for substantially flameless, pulse-free oxidation of a fuel can also be employed for solid fuel materials (coal, trash, garbage, etc), as will be described briefly below in conjunction with FIGS. 8, 9.

The apparatus schematically shown in these figures uses elements similar to those already explained in conjunction with the above-described exemplary embodiments. To this extent, identical parts are again provided with the same reference numerals and not described again here.

Figure 8:
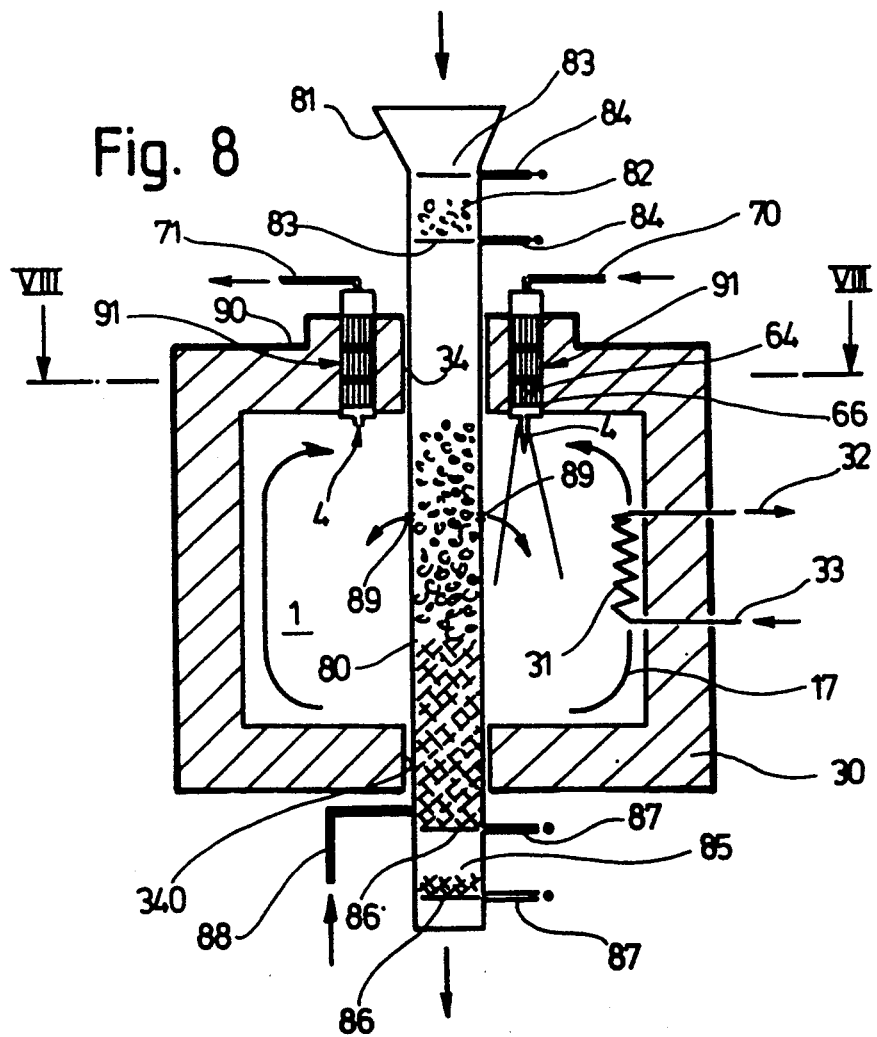
FIG. 8 is a schematic side view in axial longitudinal section of a combustion apparatus for solid fuel materials according to the invention.
Figure 9:
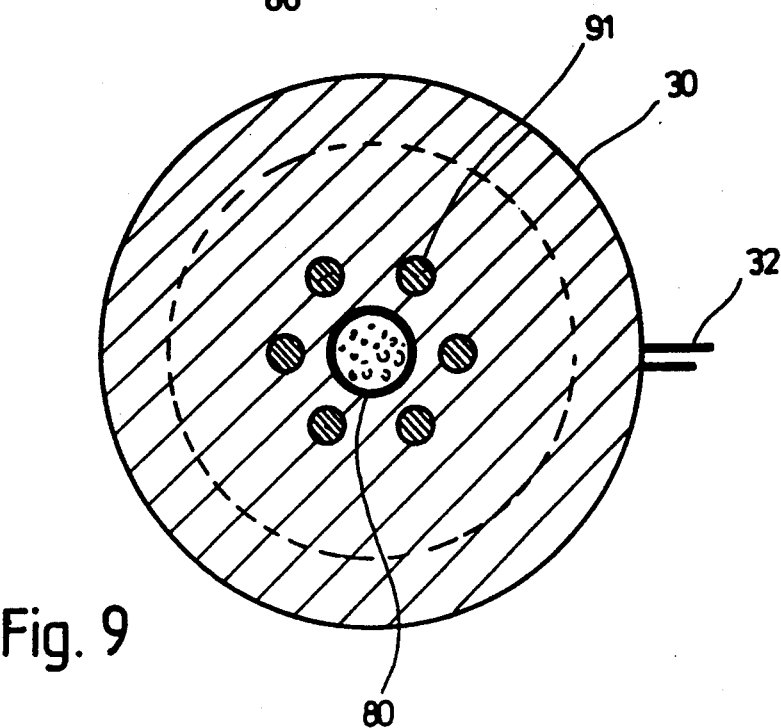
FIG. 9 is a plan view of the apparatus of FIG. 8, in a section taken along the line VIII—VIII of FIG. 8.

The combustion chamber 1 of the apparatus is contained in a furnace or combustion chamber 30, in which the tube coil 31, through which a heat transfer medium flows, is disposed to decouple useful heat, but the tube coil is indicated merely schematically in FIG. 8. Its practical embodiment can be seen from FIG. 4; it is formed coaxially with the substantially cylindrical combustion chamber 1.

In addition to the openings 34, the wall of the furnace or combustion chamber 30 also includes a second coaxial, opposite opening 340. Both openings 34, 340 receive a continuous tube 80, which is sealed off from the chamber wall. The tube 80, normally disposed in a vertical operating position, has a fill hopper 81 at the top, which is adjoined by an inlet sluice 82 with two sealed sluice doors 83, which can be flushed with air via connection necks 84.

A similar sluice 85 is provided on the opposite lower end of the tube 80, its sluice doors shown at 86; the sluice chamber can be flushed with air via the connection necks 87. A line 88, by way of which an oxidation agent such as air or water vapor can be introduced into the tube 80, discharges into the tube 80 above the lower gate 85.

In the part of its jacket extending through the combustion chamber 1, the tube 80 is provided with gas outlet openings 89, the spacing of which from the upper inner wall of the chamber is selected appropriately, and which form the fuel delivery apparatus for the substantially flameless oxidation.

Six regenerators 91 are inserted into the upper chamber wall 90, laterally beside the tube 80 and surrounding it in a ring; their basic structure is equivalent to that of any one of the regenerator cartridges 63 of FIGS. 6, 7.

Each of the regenerators 91 accordingly contains a number of stacked storage bricks 64, which are disposed in a sheet-metal outer jacket 66, in this case of cylindrical shape, which except for one or more nozzles 4 is closed on its face end toward the combustion chamber 1. On its opposite end, the outer jacket 66 is closed, forming a gas or air distribution chamber, which is connected to a distributor conduit 70 or 71 that in turn leads to a valve block, not shown in further detail, the structure of which is equivalent to that of the valve block 72 of FIG. 6.

The regenerators 91 are again subdivided into two groups of regenerators disposed in alternation with one another; hot exhaust gases flowing out of the combustion chamber 1 and cold combustion air delivered from outside flowing in alternation through the regenerators 91 of each of the two groups, so that the heat given up to the storage bricks 64 by the hot exhaust gases is then absorbed by the cold combustion air flowing through them and is exploited for preheating this air.

The nozzles 4 are disposed in a ring around the axially parallel tube 80; the axis spacing A between adjacent nozzles 4 is again greater than twice the nozzle opening diameter d.

In operation, solid fuel material in lumps is introduced via the fill hopper 81 in batches into the tube 80 via the sluice 82. Via the line 88, the oxidizing agent is introduced, by means of which, after appropriate ignition, the fuel material is partly oxidized. In this process a thermal decomposition of the fuel material occurs, and as a result combustible gases flow into the combustion chamber 1 partially or wholly through the openings 89. Preheated combustion air flows in streams out of the openings of the nozzles 4 of the group of regenerators 91 acted upon by air, and these streams become enveloped with and mix, as already described in conjunction with FIGS. 2, 3, with recirculating exhaust gases aspirated by injector action in the combustion chamber 1, resulting in a mixture of exhaust gas and combustion air that is kept at least at the temperature of ignition.

The gas outlet openings 89 in the tube 80 are disposed such that the emerging combustible gases converge with the mixture of exhaust gas and combustion air at the end of the mixing zone, so that an annular oxidation zone surrounding the tube 80 forms, in which the substantially flameless, pulse-free oxidation of the gases occurs.

Solid residues of combustion remaining in the tube 80 are removed as needed through the lower ash sluice 85, so that the overall result is a continuous mode of combustion. This apparatus, which is shown here only in terms of its schematic structure, is therefore particularly well suited for garbage and trash incineration.

The devices, described in various embodiments in conjunction with FIGS. 2 to 9, for carrying out the substantially flameless, pulse-free oxidation method are distinguished by the fact that the nitrogen oxide emissions are reduced to a practically negligible minimum with high combustion air preheating and thus excellent exploitation of the energy in the fuel. This is strikingly seen in the diagram of FIG. 10, in which the NOx proportion of the dry exhaust gas, in the form it is vented into the atmosphere, is plotted as a function of the combustion air preheating temperature for burners that operate by various methods.

The shaded field 100 represents NOx emissions for a normal industrial burner that operates with oxidation of the fuel in flames without additional provisions for reducing NOx emissions. The NOx proportion in the dry exhaust gas increases steeply with an increasing air preheating temperature, so that such burners certainly do not meet presently applicable legal requirements (TA-Luft 1986) [Technical Orders]. The course of the limit value specified by TA-Luft 1986 is included in the diagram for comparison.

Figure 10:
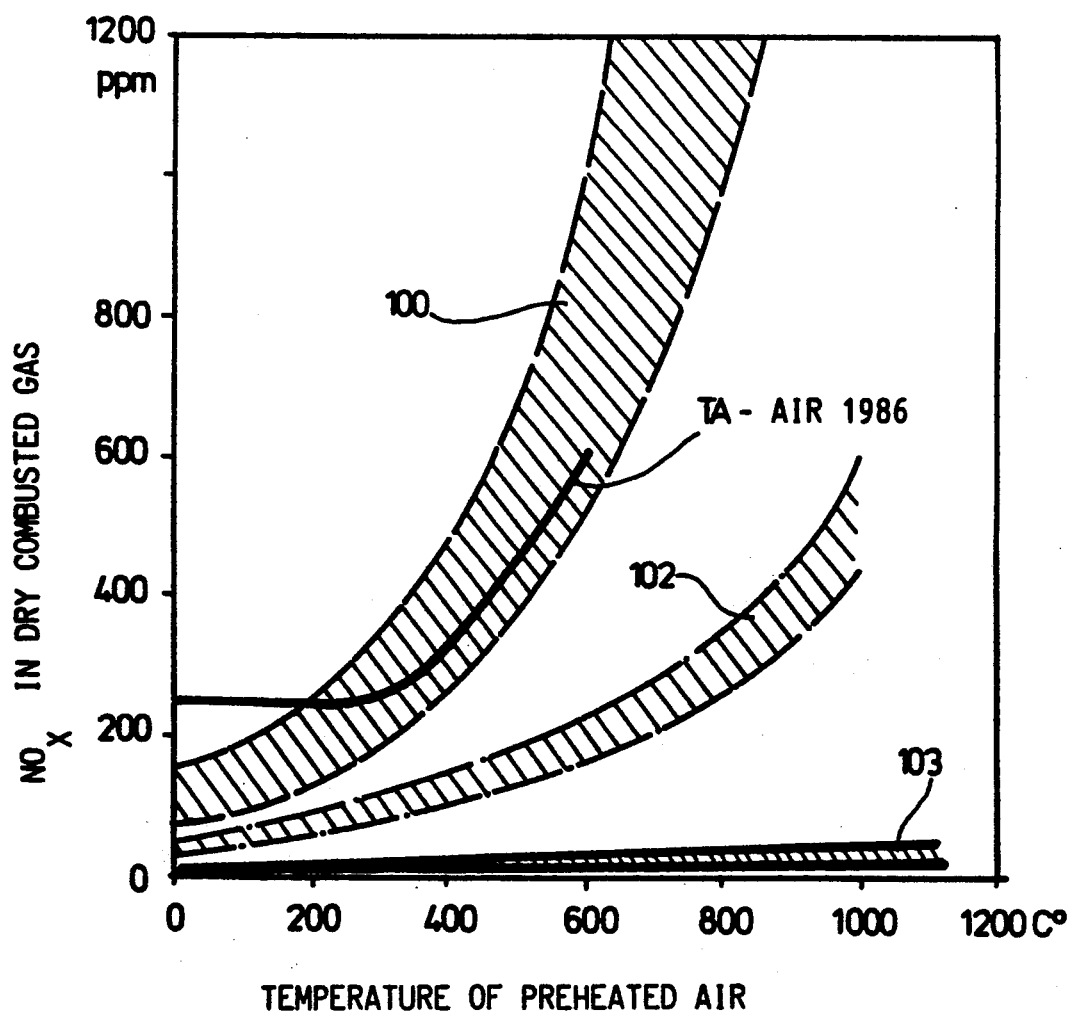
FIG. 10 is a diagram to illustrate the NOX formation occurring in various combustion events, as a function of the preheating of the combustion air.

Substantially more favorable conditions in terms of NOx emissions are attained for recuperator burners that operate with two-stage combustion, as described for instance in German Pat. No. 34 22 229. As the corresponding field 102, likewise shaded in Fig. 10, shows, a not-inconsiderable increase in the NOx proportion in the dry exhaust gas must be accepted into the bargain with an increasing combustion air preheating temperature in these burners. By comparison, the field 103, which represents conditions in a recuperator or regenerator burner operating by the novel method and as shown in FIG. 4 and 6, respectively, shows that the virtually vanishing proportion of NOX in the dry exhaust gas increases only insignificantly with increasing combustion air preheating temperature and therefore is negligible overall. As a result, practically arbitrarily high air preheating can be used in this method, without having to expect an inadmissibly high development of NOx.

To lower the necessary ignition temperature, a catalyst, for instance of iron oxide, may be disposed in the combustion chamber 1. It is also conceivable to add finely distributed catalyst material to the fuel and/or to the combustion air.

In combustion chambers of small volume, it may be necessary to carry the exhaust gas, flowing out of the combustion chamber 1, via a catalyst (such as iron), which oxidizes any remaining component of carbon monoxide.

The novel method has the advantage that it can work with high air preheating. In special individual cases, however, it can also be carried out without air preheating or with relatively slight air preheating, for instance if extremely dirty exhaust gases are to be expected.

Instances are also conceivable in which the fuel is preheated, to which end exhaust gas heat can again be used.

The exemplary embodiments of FIGS. 4, 5 and 6, 7 relate to burners for direct heating of a furnace or combustion chamber 20 and 30, respectively. The novel method can also be used, however, to operate jet pipes in which exhaust gas recirculation is possible, such as in jacketed jet pipes and P-jet pipes. The combustion chamber in that case is located in the jet pipe.

The novel method can be used for practically any kind of heat recovery, in particular for commercial or industrial use. Since even with maximum preheating of the combustion air, the NOx values are lower than with flame operation using cold air, it may be suitable even in low-temperature processes (such as hot-water preparation), to limit the useful heat decoupling by reducing the heat exchanger surfaces, and recovering the remaining heat content from the exhaust gases by using it to preheat the combustion air.

The result is extremely low emissions of NOx and noise, while at the same time the apparatus is relatively inexpensive and economical in terms of space.

The novel method can be performed with gaseous or liquid (atomized or evaporated) fuel, but it is also suitable for the incineration of solid fuel materials that can be at least partly thermally decomposed (gasified), producing combustible gases. It can be used not only in so-called recuperator burners and so-called regenerative burners, but also in systems for incinerating coal, garbage, trash, and other combustible material.

Various changes and modifications may be made, and features described with any one of the embodiments may be used with any of the others, within the scope of the inventive concept.

I claim:

1. A method for combusting fuel in a combustion chamber, which fuel is oxidized with hot combustion air in the presence of recirculated exhaust gases, characterized in that exhaust gases from which useful heat dissipated laterally with respect to flow of said recirculated exhaust gases has previously been removed from the system, are mixed with the hot combustion air in an exhaust gas recirculation ratio of $r \leq 2$ (the exhaust gas ratio being defined as the ratio between the flow rates of the recirculated exhaust gases and of combustion air), in that said mixture of exhaust gas and combustion air is kept at a temperature that is higher than the ignition temperature, and in that the mixture of exhaust gas and combustion air is then brought together with the fuel, forming an oxidation zone in which a substantially flameless and pulse-free oxidation takes place in the combustion chamber.

2. The method according to claim 1, characterized in that combustion air is guided, in the form of streams of air emerging from nozzles, through a substantially fuel-free region in which the streams of air become enveloped by and mixed with exhaust gases aspirated from the combustion chamber by injector action before the mixture is brought together with the fuel.

3. The method according to claim 2, characterized in that the streams of air are disposed in a ring, and the delivery of fuel in the region enveloped by the streams of air takes place at a predetermined distance downstream of the nozzle openings.

4. The method according to claim 3, characterized in that the minimum axial spacing (A) of adjacent nozzle openings is greater than twice the nozzle opening diameter (d).

5. The method according to claim 3, characterized in that the flow speed of the combustion air upon emerging from the nozzle openings is at least 20 m/sec.

6. The method according to claim 1, characterized in that the combustion air is preheated with a degree of air preheating of $\epsilon > 0.6$.

7. The method according to claim 1, characterized in that exhaust gases from which useful heat has previously been removed are used for air preheating.

8. The method according to claim 7, characterized in that the mixture of exhaust gas and combustion air is kept at ignition temperature, at least in the oxidation zone, by the delivery of external heat.

9. The method according to claim 1, characterized in that the ignition temperature is reduced catalytically in the oxidation zone.

10. The method according to claim 1, characterized in that in cold starting, fuel is first combusted with a stable flame in combustion chamber with a suitable excess of air, until the mixture of exhaust gas and combustion air can be brought to at least ignition temperature, and that then, by suitable variation of the delivery of combustion air and/or fuel, the reaction conditions in the oxidation zone are shifted to support substantially flameless and pulse-free oxidation.

11. The method according to claim 10, characterized in that upon startup, the emission of light in the UV range by the flame is monitored, and after the onset of the substantially flameless and pulse-free oxidation the absence of this emission of light in the UV range is monitored.

12. The method according to claim 1, characterized in that the temperature elevation in the combustion chamber measured downstream of the oxidation zone is used to monitor the substantially flameless and pulse-free oxidation.

13. The method according to claim 1, characterized in that solid or liquid fuel material is thermally decomposed (gasified) in the combustion chamber, and that the combustible gas released during this process is oxidized directly as fuel, substantially flamelessly and without pulsation, in the oxidation zone.

14. An apparatus for combustion of a fuel in a combustion chamber having nozzles for combustion air that re-aspirates exhaust gases by injector action, having air guide means for delivering hot combustion air to the nozzles, having a fuel delivery device, characterized in that said apparatus has nozzle device means (4, 48) for producing substantially flameless and pulse-free oxidation of the fuel by a suitable disposition and embodiment of said nozzle device means (4, 48) and by provision of a re-aspiration by said nozzle device means of exhaust gases from the combustion chamber (1), at an exhaust gas recirculation ratio of $r > 2$, and means for mixing the hot combustion air emerging from the nozzle device means (4, 48) with the re-aspirated exhaust gases that have partly cooled in the combustion chamber (1) at a resultant temperature which is, at least, sufficient to produce ignition, and said apparatus has fuel delivery device means (15, 41) for delivering the fuel to said mixture to an oxidation zone (19) in said combustion chamber and forming in the combustion chamber (1) in co-operation with said nozzle device means (4, 48), said substantially flameless and pulse-free oxidation of the fuel results.

15. The apparatus according to claim 14, characterized in that said nozzle device means comprises a number of nozzles (4) arranged in a ring, and that said fuel delivery device means is constituted as means for discharging fuel (at 15) within the ring formed by the nozzles (4).

16. The apparatus according to claim 15 characterized in that said nozzles are arranged in said ring so that the minimum axis spacing (A) of adjacent nozzle openings is greater than twice the nozzle opening diameter (d).

17. The apparatus according to claim 15, characterized in that said nozzles (4) are so arranged that the spacing, measured in the flow direction, between the periphery of a nozzle opening and the region in which the liquid or gaseous fuel emerging from the fuel delivery device means (15) is delivered to said mixture, is greater than six times the nozzle opening diameter (d).

18. The apparatus according to claim 15, characterized in that the said nozzles are designed to provide an exit speed of the combustion air from the nozzles (4) is at least 20 m/sec for a sufficient quantitative rate of combustion air supply for supporting combustion.

19. The apparatus according to claim 17, characterized in that the fuel delivery device means, for operating with gaseous or finely dispersed or evaporated liquid fuel, has a fuel outlet nozzle (15) which has a discharge opening located downstream of the combustion air nozzles of said nozzle device means (4) by a predetermined distance.

20. The apparatus according to claim 19, characterized in that the distance between said fuel outlet nozzle (15) and said combustion air nozzles (4) is adjustable.

21. The apparatus according to claim 14, characterized in that at least one of said air delivery device, said nozzle device means (4) and the fuel delivery device means is equipped with means for switching over between two different operating states, forming flames and in the other of which the fuel is oxidized substantially flamelessly and in a manner free of pulsation.

22. The apparatus according to claim 21, characterized in that said apparatus further comprising a combustion chamber (37) positioned within the ring formed by the nozzles (4) of said nozzle device means, in which chamber the fuel delivery device means (41) discharges and which has combustion air inlets (40), and in that air control means (72) are associated with the combustion air inlets (40) and the nozzles (4), by which air control means throughput of combustion air through the combustion air inlets (40) and the nozzles (4) is selectively controllable.

23. The apparatus according to claim 14, characterized in that said apparatus includes a recuperator (47, 48) upstream of the nozzles (4) of the nozzle device means, through which recuperator flow the combustion air and exhaust gases, from which useful heat has already been removed in the combustion chamber (1).

24. The apparatus according to claim 15, characterized in that said apparatus has a regenerator burner (60) and includes at least two regenerator units (63) through which combustion air and exhaust gases flow that have been cooled by the removal of useful heat, said regenerator having units assigned to them switchover device means for alternately supplying combustion air and exhaust gases to at least a first one of said regenerator units, while at least a second of said at least two regenerator units is supplied with combustion air while said first regeneration unit is supplied with exhaust gases and vice versa.

25. The apparatus according to claim 24, characterized in that the regenerator units (63) are disposed surrounding the fuel delivery device means (41), forming therewith a structural unit.

26. The apparatus according to claim 25, characterized in that the regenerator units (63) are each formed in the manner of cartridges, having at least one combustion air nozzle (4) disposed its face end toward the combustion chamber (1).

27. The apparatus according to claim 14, in particular for solid, thermally decomposable or gassifiable fuel material, characterized in that the fuel delivery device means has a heatable antechamber (80), disposed adjacent the combustion chamber (1), which antechamber (80) is provided with at least one antechamber outlet (89), discharging into the combustion chamber (1), for gaseous fuel produced by gasification, and said at least one antechamber outlet (89) discharges inside the ring formed by the combustion air nozzles (4) of said nozzle device means.

28. The apparatus according to claim 27, characterized in that said antechamber (80) is equipped with means for being supplied with fuel materials in a continuous mode of operation.

29. The apparatus according to claim 28, characterized in that said antechamber comprises a tube (80)

closable on both ends, which is provided with at least one antechamber fuel outlet (89) and is disposed extending through and sealed off from the combustion chamber (1) except for its said outlet.

30. The apparatus according to claim 29, characterized in that said tube (80) is closable at both ends by stopper devices (82, 85) and has an oxidation agent inlet (88).

31. The apparatus according to claim 29, characterized in that said tube (80) has means for filling it with fuel material (81, 82) on one end and on the other end removal device means (85) for disposal of combustion residues.

* * * * *